(12) United States Patent
Tsou

(10) Patent No.: US 9,106,549 B2
(45) Date of Patent: Aug. 11, 2015

(54) ETHERNET COMMUNICATION CIRCUIT WITH AUTO MDI/MDIX FUNCTION

(71) Applicant: Realtek Semiconductor Corp., Hsinchu (TW)

(72) Inventor: Shan-Chih Tsou, Hsinchu (TW)

(73) Assignee: REALTEK SEMICONDUCTOR CORP., Hsinchu (TW)

( * ) Notice: Subject to any disclaimer, the term of this patent is extended or adjusted under 35 U.S.C. 154(b) by 390 days.

(21) Appl. No.: 13/770,474

(22) Filed: Feb. 19, 2013

(65) Prior Publication Data

US 2013/0223439 A1    Aug. 29, 2013

(30) Foreign Application Priority Data

Feb. 24, 2012 (TW) .............................. 101106200 A

(51) Int. Cl.
*H03K 3/00* (2006.01)
*H04L 12/933* (2013.01)
*G06F 13/40* (2006.01)

(52) U.S. Cl.
CPC ............ *H04L 49/10* (2013.01); *G06F 13/4072* (2013.01); *G06F 2213/3808* (2013.01)

(58) Field of Classification Search
CPC ......... H04L 12/00; H04L 12/02; H04L 12/64; H04L 12/66; H04L 49/10

USPC .......... 326/62, 82, 83, 86; 327/100, 108, 109, 327/111, 112

See application file for complete search history.

(56) References Cited

U.S. PATENT DOCUMENTS 6,703,865 B2 *    3/2004    Chan .............................. 326/82

* cited by examiner

*Primary Examiner* — William Hernandez
(74) *Attorney, Agent, or Firm* — Birch, Stewart, Kolasch & Birch, LLP

(57) ABSTRACT

An Ethernet communication circuit includes: a current source; a first transistor coupled between a first node and a third node, and having a control terminal coupled with a first signal pin; a second transistor coupled between the first node and a fourth node, and having a control terminal coupled with a second signal pin; a third transistor coupled between a second node and the fourth node, and having a control terminal coupled with a third signal pin; a fourth transistor coupled between the second node and the third node, and having a control terminal coupled with a fourth signal pin; a first switch coupled between the third node and the current source; a second switch coupled between the fourth node and the current source; and a transconductance circuit for generating an output voltage according to the current passing through the first node and the current passing through the second node.

12 Claims, 4 Drawing Sheets

ETHERNET COMMUNICATION CIRCUIT WITH AUTO MDI/MDIX FUNCTION

CROSS-REFERENCE TO RELATED APPLICATIONS

This application claims the benefit of priority to Patent Application No. 101106200, filed in Taiwan on Feb. 24, 2012; the entirety of which is incorporated herein by reference for all purposes.

BACKGROUND

The disclosure generally relates to an Ethernet communication device and, more particularly, to an Ethernet communication device supporting an auto medium dependent interface (MDI)/medium dependent interface crossover (MDIX) function.

When an Ethernet device is connected by using a twisted pair cable, a straight-through cable is required if a MDI device, such as a network card or a router, is to be connected with a MDIX device, such as a hub or an exchanger. If a MDI device is to be connected with another MDI device or a MDIX device is to be connected with another MDIX device, a crossover cable is required for the connection. As a result, network managers have to adopt different types of cables depending on the type of devices to be connected, which is troublesome to the network management. Accordingly, some Ethernet devices adopted the auto MDI/MDIX function to automatically detect the type of signal transmitted and received at a transmission port, so as to communicate with another Ethernet communication device correctly.

In a traditional structure supporting the auto MDI/MDIX function, two sets of communication circuits are employed at each of transmission ports to respectively receive a signal transmitted through the straight-through cable and a signal transmitted through the cross-over cable. Afterward, according to the signals received by the two communication circuits, a subsequent stage circuit selects a suitable type of signal to communicate with another Ethernet device. However, this structure requires two sets of communication circuits at each of transmission ports so the hardware structure is more complicated and the circuit area is greater as well. As a result, the circuitry design complexity and hardware cost are both increased.

Accordingly, another traditional approach utilizes only one communication circuit at each of transmission ports, but a plurality of switches are employed between the communication circuit and each of multiple signal pins. The communication circuit can switch to different signal pins via the switches to determine the type of received signal at the transmission port. However, a disadvantage of this approach is that the above switches are connected directly with the signal pins. If the ESD protection level of the selected switch is not robust enough, the signal path between the communication circuit and the signal pin is easily damaged, thereby causing malfunction of the Ethernet device.

SUMMARY

In view of the foregoing, it can be appreciated that a substantial need exists for apparatuses that can effective reduce the circuit area of the Ethernet device supporting the auto MDI/MDIX function and prevent the signal path between the communication circuit and the signal pin from damage due to ESD.

An embodiment of an Ethernet communication circuit for processing signals received from a first signal pin, a second signal pin, and third signal pin, and a forth signal pin, wherein the first signal pin and the forth signal pin are utilized for receiving a pair of differential MDI signals, and the second signal pin and the third signal pin are utilized for receiving a pair of differential crossover MDIX signals is disclosed. The Ethernet communication circuit comprises: a current source; a first transistor, coupled between a first node and the current source, wherein a control terminal of the first transistor is coupled with the first signal pin; a second transistor, coupled between the first node and the current source, wherein a control terminal of the second transistor is coupled with the second signal pin; a third transistor, coupled between a second node and the current source, wherein a control terminal of the third transistor is coupled with the third signal pin; a fourth transistor, coupled between the second node and the current source, wherein a control terminal of the fourth transistor is coupled with the fourth signal pin; a first switch, coupled between the current source and the first transistor or coupled between the first node and the first transistor; a second switch, coupled between the current source and the second transistor or coupled between the first node and the second transistor; a third switch, coupled between the current source and the third transistor or coupled between the second node and the third transistor; a fourth switch, coupled between the current source and the fourth transistor or coupled between the second node and the fourth transistor; a transconductance circuit, coupled with the first node and the second node, and configured to operably generate an output voltage according to a current passing through the first node and a current passing through the second node; when the first switch turns on, the fourth switch turns on and the second switch and the third switch turn off, and when the second switch turns on, the third switch turns on and the first switch and the fourth switch turn off.

Another embodiment of an Ethernet communication circuit for processing signals received from a first signal pin, a second signal pin, a third signal pin, and a fourth signal pin, wherein the first signal pin and the fourth signal pin are utilized for receiving a pair of differential MDI signals, and the second signal pin and the third signal pin are utilized for receiving a pair of differential crossover MDIX signals is disclosed. The Ethernet communication circuit comprises: a current source; a first transistor, coupled between a first node and a third node, wherein a control terminal of the first transistor is coupled with the first signal pin; a second transistor, coupled between the first node and a forth node, wherein a control terminal of the second transistor is coupled with the second signal pin; a third transistor, coupled between a second node and the forth node, wherein a control terminal of the third transistor is coupled with the third signal pin; a fourth transistor, coupled between the second node and the third node, wherein a control terminal of the fourth transistor is coupled with the fourth signal pin; a first switch, coupled between the third node and the current source; a second switch, coupled between the forth node and the current source; a transconductance circuit, coupled with the first node and the second node and configured to operably generate an output voltage according to a current passing through the first node and a current passing through the second node; when the first switch turns on, the second switch turns off, and when the second switch turns on, the first switch turns off.

It is to be understood that both the foregoing general description and the following detailed description are example and explanatory only and are not restrictive of the invention, as claimed.

DETAILED DESCRIPTION

Reference is made in detail to embodiments of the invention, which are illustrated in the accompanying drawings.

Figure 1:
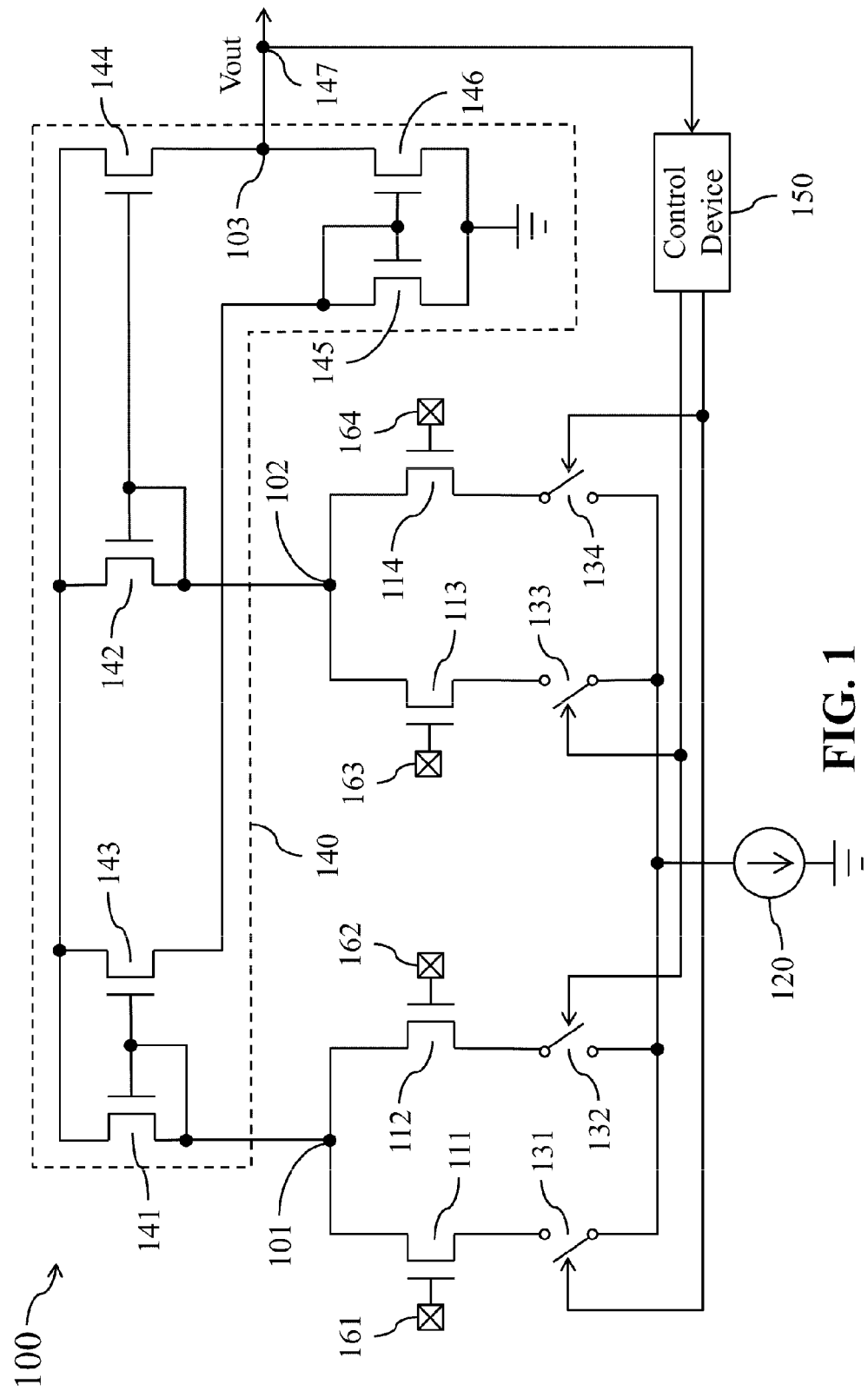
FIG. 1~4 show simplified functional block diagrams of an Ethernet communication circuit according to several embodiments of the present disclosure.

FIG. 1 shows a simplified functional block diagram of an Ethernet communication circuit 100 according to an embodiment of the present disclosure. The Ethernet communication circuit 100 is coupled with a transmission port of an Ethernet device, such as a network card, a hub, or a switch, to receive a signal transmitted through a network cable coupled with the transmission port. The Ethernet communication circuit 100 comprises transistors 111, 112, 113, and 114, a current source 120, switches 131, 132, 133, 134, a transconductance circuit 140, and a control device 150.

A first terminal of the transistor 111 is coupled with a node 101 and a control terminal of the transistor 111 is coupled with a signal pin 161. A first terminal of transistor 112 is coupled with the node 101 and a control terminal of the transistor 112 is coupled with a signal pin 162. A first terminal of the transistor 113 is coupled with a node 102 and a control terminal of the transistor 113 is coupled with a signal pin 163. A first terminal of the transistor 114 is coupled with the node 102 and a control terminal of the transistor 114 is coupled with a signal pin 164. The signal pins 161 and 164 are respectively utilized for receiving medium dependent interface (MDI) signals, MDIp and MDIn, and the signal pins 162 and 163 are respectively utilized for receiving medium dependent interface crossover (MDIX) signals, MDIXp and MDIXn.

In other words, the control terminals of the transistor 111, the transistor 112, the transistor 113, and the transistor 114 of the Ethernet communication circuit 100 are fixedly coupled with the signal pins 161, 162, 163, and 164, respectively, and no switch component is utilized as an intermedium on each of signal path between the Ethernet communication circuit 100 and each of the signal pins 161, 162, 163, and 164. One terminal of the current source 120 is coupled with the switches 131, 132, 133, and 134 and the other terminal of the current source 120 is coupled with a fixed-voltage terminal, such as a grounded terminal.

In implementation, the switch 131 is coupled between the current source 120 and the transistor 111, or between the transconductance circuit 140 and the transistor 111. The switch 132 is coupled between the current source 120 and the transistor 112, or between the transconductance circuit 140 and the transistor 112. The switch 133 is coupled between the current source 120 and the transistor 113, or between the transconductance circuit 140 and the transistor 113. The switch 134 is coupled between the current source 120 and the transistor 114, or between the transconductance circuit 140 and the transistor 114. For example, in the embodiment of FIG. 1, the switch 131 is coupled between a second terminal of the transistor 111 and the current source 120, the switch 132 is coupled between a second terminal of the transistor 112 and the current source 120, the switch 133 is coupled between a second terminal of the transistor 113 and the current source 120, and the switch 134 is coupled between a second terminal of the transistor 114 and the current source 120.

The transconductance circuit 140 is coupled with the nodes 101 and 102, and configured to operably generate an output voltage Vout according to a current flowing through the node 101 and a current flowing through the node 102. In the embodiment of FIG. 1, the transconductance circuit 140 comprises transistors 141~146 and an output terminal 147. A first terminal of the transistor 141 is coupled with a first terminal of the transistor 142, a first terminal of the transistor 143, a first terminal of the transistor 144, and a fixed-voltage level, such as 3V. A second terminal and a control terminal of the transistor 141 are coupled with the node 101. A second terminal and a control terminal of transistor 142 are coupled with the node 102. A control terminal of the transistor 143 is coupled with the control terminal of the transistor 141 to form a current mirror structure. A second terminal of the transistor 144 is coupled with the output terminal 147, and a control terminal of the transistor 144 is coupled with the control terminal of the transistor 142 to form another current mirror structure. A first terminal of the transistor 145 is coupled with a second terminal of transistor 143, and a second terminal of the transistor 145 is coupled with a fixed-voltage terminal, such as a grounded terminal. A first terminal of the transistor 146 is coupled with the output terminal 147, and a control terminal of the transistor 146 is coupled with a control terminal of the transistor 145 to form another current mirror structure.

In operations, the current mirror formed by the transistor 141 and the transistor 143 duplicates the current flowing through the node 101 to the first terminal of the transistor 145. The current mirror formed by the transistor 142 and the transistor 144 duplicates the current flowing through the node 102 to the first terminal of the transistor 146. Hence, the output voltage Vout generated at the output terminal 147 of the transconductance circuit 140 corresponds to a difference between the current flowing through the node 101 and the current flowing through the node 102.

The control device 150 is coupled with the control terminals of the switches 131, 132, 133, and 134, and the output terminal 147 of the transconductance circuit 140. When detecting the type of the network cable, the control device 150 selectively turns on part of the switches 131~134 to couple the current source 120 with the transistors 111 and 114 or to couple the current source 120 with the transistors 112 and 113. In the embodiment of FIG. 1, when the control device 150 turns on the switch 131, the control device 150 turns on the switch 134 and turns off the switches 132 and 133, so that the current source 120 is coupled with the transistors 111 and 114. In this situation, the current flowing through the node 101 and the current flowing through the node 102 are related to signals received by the signal pins 161 and 164, so that the output voltage Vout of the transconductance circuit 140 is also related to the signals received by the signal pins 161 and 164 as well. The control device 150 may determine whether MDI signals appear on the signal pins 161 and 164 according to the output voltage Vout of the transconductance circuit 140.

When the control device 150 turns on the switch 132, the control device 150 turns on the switch 133 and turns off the switches 131 and 134, so that the current source 120 is coupled with the transistors 112 and 113. In this situation, the current flowing through the node 101 and the current flowing through the node 102 are related to signals received by the signal pins 162 and 163, so that the output voltage Vout of the transconductance circuit 140 is also related to the signals received by the signal pins 162 and 163 as well. The control device 150 may determine whether MDIX signals appear on the signal pins 162 and 163 according to the output voltage Vout of the transconductance circuit 140.

As a result, the control device 150 is able to determine the type of signal transmitted and received on the transmission port according to the output voltage Vout of the transconductance circuit 140, so that the subsequent stage circuit of the Ethernet communication circuit 100 is allowed to perform a corresponding configuration setting, thereby achieving the auto MDI/MDIX function.

In implementation, depending on the design of the control signal generated by the control device 150, the switches 131 and 132 may be two transistors turned on by opposite control logic levels, such as an N channel field effect transistor and a P channel field effect transistor, or may be two transistors turned on by the same control logic level. Similarly, the switches 133 and 134 may be two transistors turned on by opposite control logic levels, or may be two transistors turned on by the same control logic level.

In the Ethernet communication circuit 100, the switches 131~134 are coupled between current source 120 and the transistors 111~114, but this is merely an example rather than a restriction to the practical implementation. As described above, the switches 131~134 may be coupled between the transconductance circuit 140 and the transistors 111~114.

Figure 2:
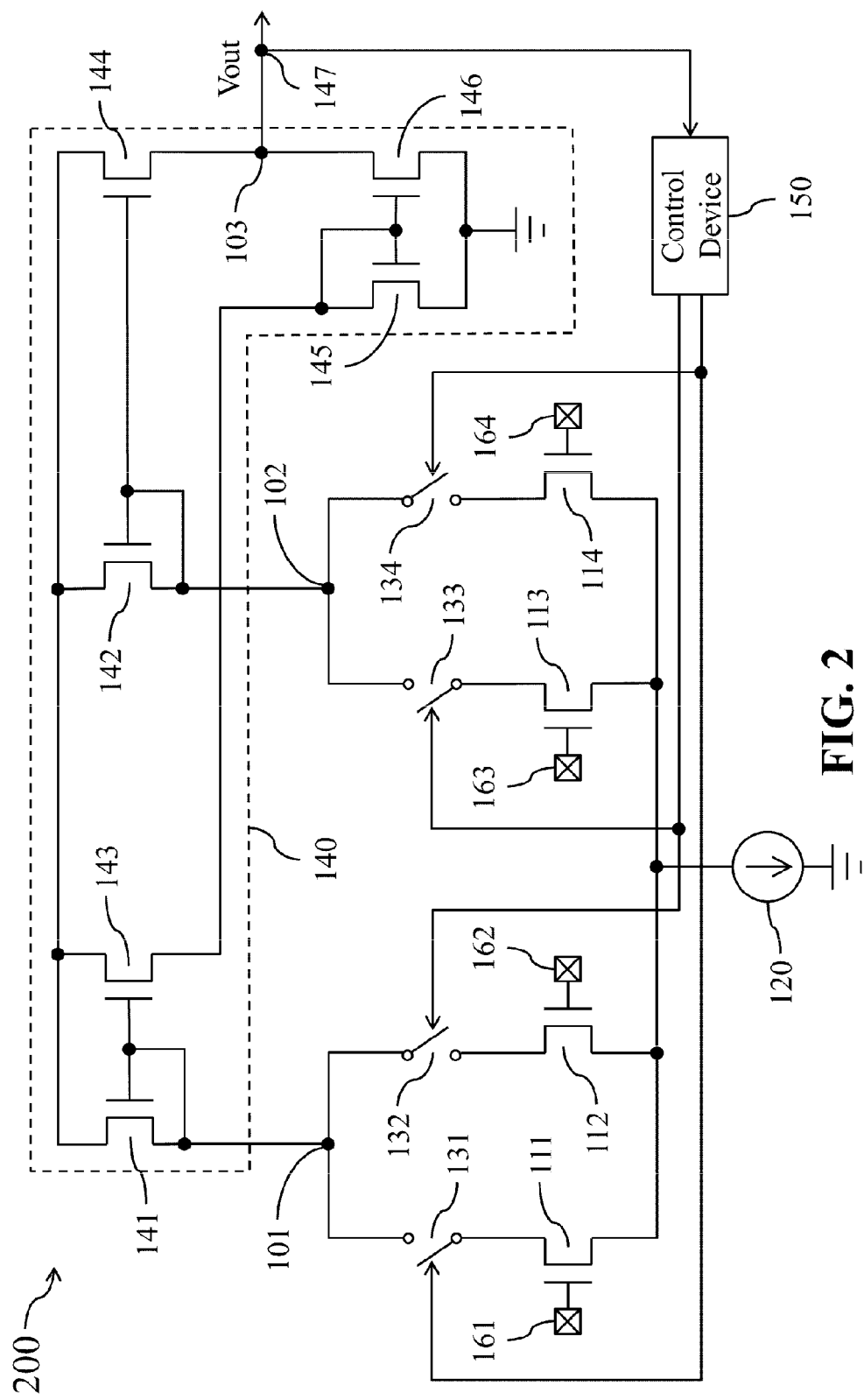

For example, FIG. 2 shows a simplified functional block diagram of an Ethernet communication circuit 200 according to another embodiment of the present disclosure. The embodiment of FIG. 2 is similar to the embodiment of FIG. 1. The descriptions regarding the connections among the transistor 111~114 and the signal pins 161~164 of FIG. 1 and related operations are also applicable to the embodiment of FIG. 2. For simplicity, the descriptions will not be repeated here.

A difference between the Ethernet communication circuit 200 and the aforementioned Ethernet communication circuit 100 is that the locations of the switches 131~134 are different. In the Ethernet communication circuit 200, the switch 131 is coupled between the first terminal of the transistor 111 and the node 101, the switch 132 is coupled between the first terminal of the transistor 112 and the node 101, the switch 133 is coupled between the first terminal of the transistor 113 and the node 102, and the switch 134 is coupled between the first terminal of the transistor 114 and the node 102.

The transconductance circuit 140 of the embodiment of FIG. 2 is the same as the transconductance circuit 140 of the embodiment of FIG. 1, so the descriptions regarding the operations and implementations of the transconductance circuit 140 of FIG. 1 are also applicable to the transconductance circuit 140 of FIG. 2. For simplicity, the descriptions will not be repeated here.

When detecting the type of the network cable, the control device 150 of the Ethernet communication circuit 200 selectively turns on part of the switches 131~134 to couple the transconductance circuit 140 with the transistors 111 and 114 or to couple the transconductance circuit 140 with the transistors 112 and 113. When the control device 150 turns on the switch 131, the control device 150 turns on the switch 134 and turns off the switches 132 and 133, so that the transistor 111 is coupled with the node 101 and the transistor 114 is coupled with the node 102. In this situation, the current flowing through the node 101 and the current flowing through the node 102 are related to the signals received by the signal pins 161 and 164, so that the output voltage Vout of the transconductance circuit 140 is also related to the signals received by the signal pins 161 and 164. The control device 150 may determine whether MDI signals appear on the signal pins 161 and 164 according to the output voltage Vout of the transconductance circuit 140.

When the control device 150 turns on the switch 132, the control device 150 turns on the switch 133 and turns off the switches 131 and 134, so that the transistor 112 is coupled with the node 101 and the transistor 113 is coupled with the node 102. In this situation, the current flowing through the node 101 and the current flowing through the node 102 are related to signals received by the signal pins 162 and 163, so that the output voltage Vout of the transconductance circuit 140 is also related to the signals received by the signal pins 162 and 163 as well. The control device 150 may determine whether MDIX signals appear on the signal pins 162 and 163 according to the output voltage Vout of the transconductance circuit 140.

As a result, the control device 150 is able to determine the type of signal transmitted and received on the transmission port according to the output voltage Vout of the transconductance circuit 140, so that the subsequent stage circuit of the Ethernet communication circuit 200 is allowed to perform a corresponding configuration setting, thereby achieving the auto MDI/MDIX function.

Figure 3:
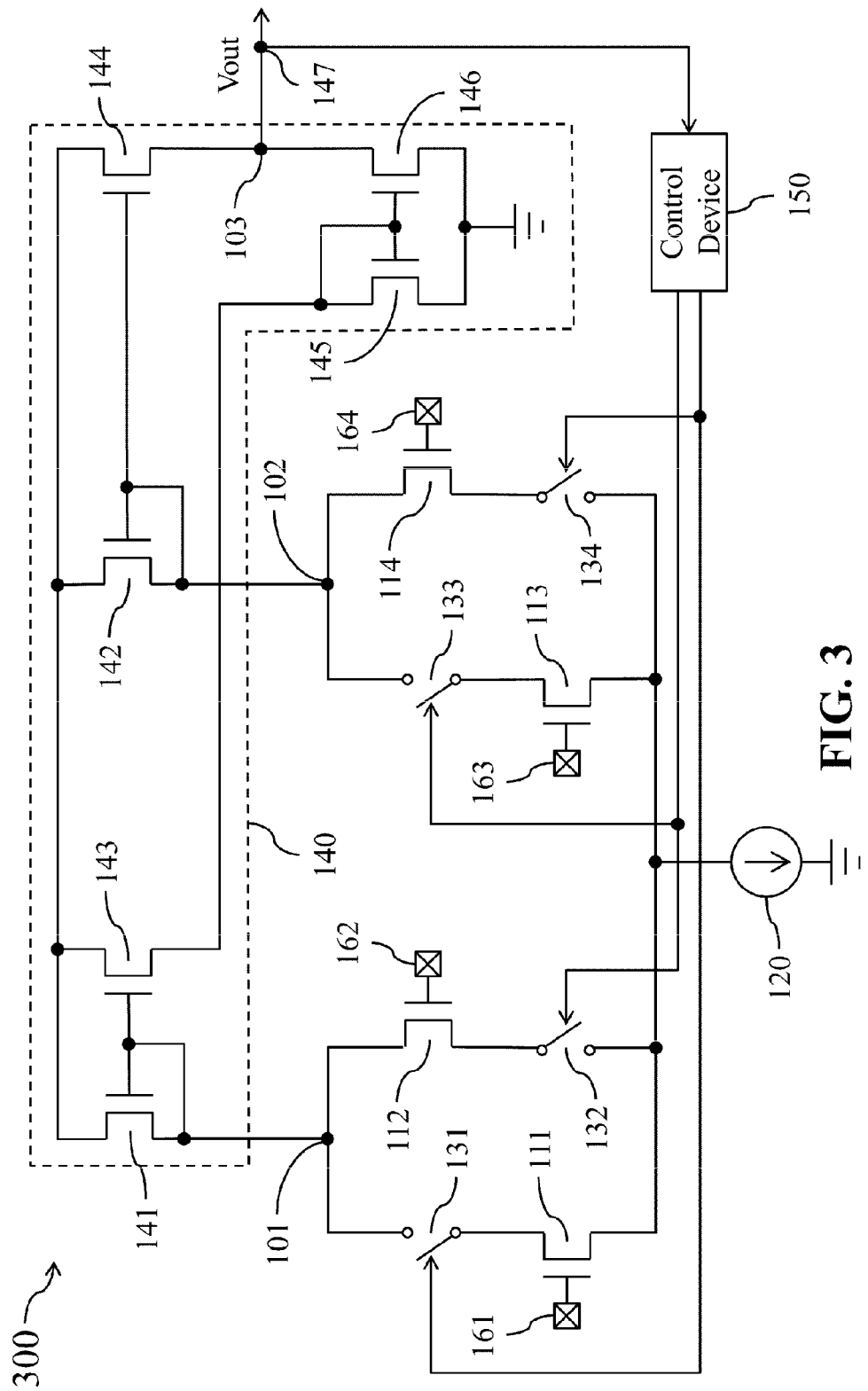

For another example, FIG. 3 shows a simplified functional block diagram of an Ethernet communication circuit 300 according to another embodiment of the present disclosure. The embodiment of FIG. 3 is similar to the embodiment of FIG. 1. The descriptions regarding the connections among the transistor 111~114 and signal pins 161~164 of FIG. 1 and related operations are also applicable to the embodiment of FIG. 3. For simplicity, the descriptions will not be repeated here.

In the Ethernet communication circuit 300, the switch 131 is couple between the first terminal of the transistor 111 and the node 101, the switch 132 is coupled between the second terminal of the transistor 112 and the current source 120, the switch 133 is coupled between the first terminal of the transistor 113 and the node 102, and the Switch 134 is coupled between the second terminal of the transistor 114 and the current source 120.

The descriptions regarding the operations and implementations of the transconductance circuit 140 of FIG. 1 are also applicable to the transconductance circuit 140 of FIG. 3. For simplicity, the descriptions will not be repeated here.

When detecting the type of the network cable, the control device 150 of the Ethernet communication circuit 300 selectively turns on part of the switches 131~134 to change the signal meaning represented by the current flowing through the node 101 and the current flowing through the node 102. When the control device 150 turns on the switch 131, the control device 150 turns on the switch 134 and turns off the switches 132 and 133, so that the current flowing through the node 101 and the current flowing through the node 102 are related to the signals received by the signal pins 161 and 164. In this situation, the output voltage Vout of the transconductance circuit 140 is also related to the signals received by the signal pins 161 and 164, so that the control device 150 may determine whether MDI signals appear on the signal pins 161 and 164 according to the output voltage Vout of the transconductance circuit 140.

When the control device 150 turns on the switch 132, the control device 150 turns on the switch 133 and turns off the switches 131 and 134, so that the current flowing through the node 101 and the current flowing through the node 102 are related to the signals received by the signal pins 162 and 163. In this situation, the output voltage Vout of the transconductance circuit 140 is also related to the signals received by the signal pins 162 and 163, so that the control device 150 may determine whether MDIX signals appear on the signal pins 162 and 163 according to the output voltage Vout of the transconductance circuit 140.

As a result, the control device 150 is able to determine the type of signal transmitted and received on the transmission port according to the output voltage Vout of the transconductance circuit 140, so that the subsequent stage circuit of the Ethernet communication circuit 300 is allowed to perform a corresponding configuration setting, thereby achieving the auto MDI/MDIX function.

Figure 4:
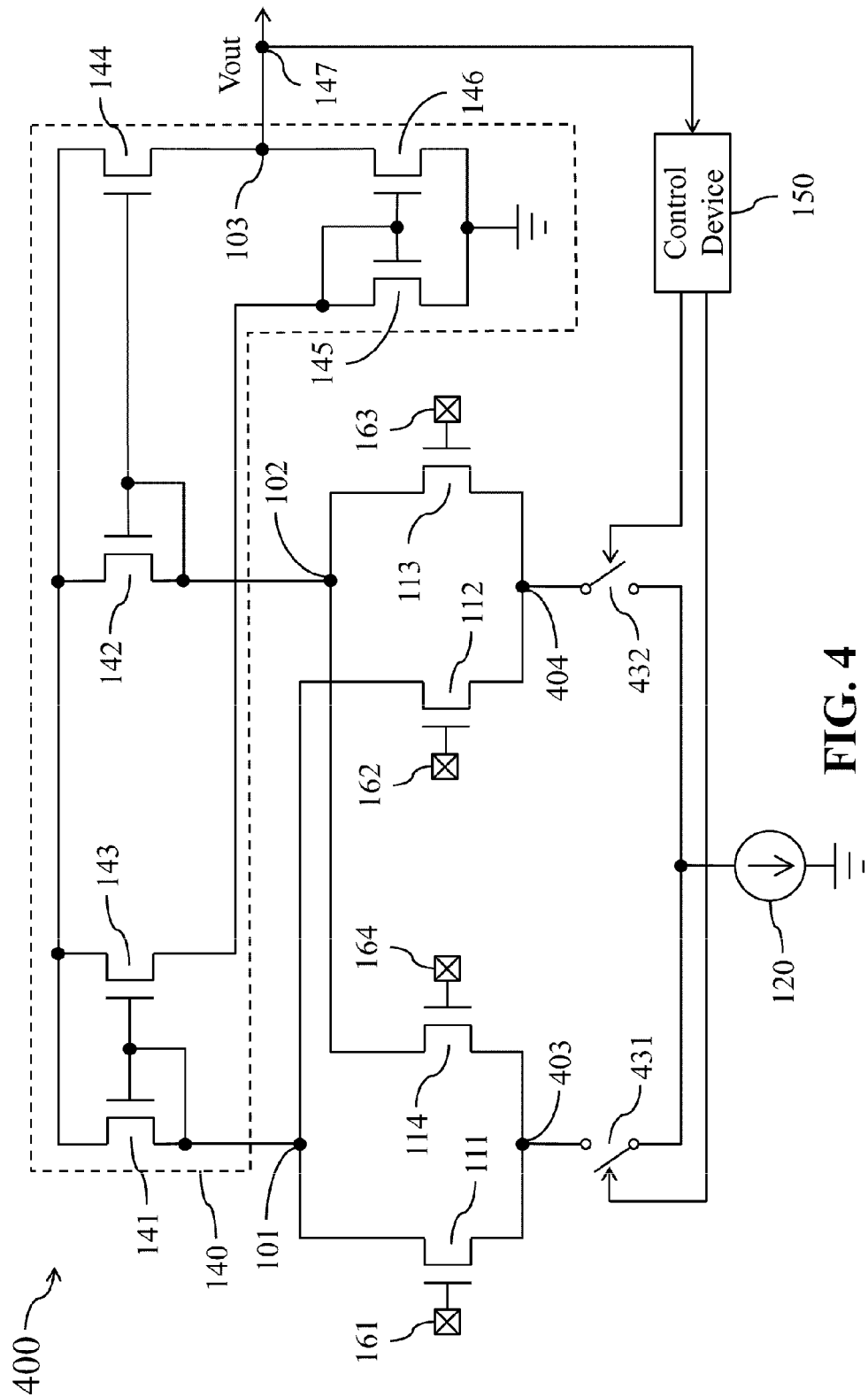

FIG. 4 shows a simplified functional block diagram of an Ethernet communication circuit 400 according to another embodiment of the present disclosure. The descriptions regarding the connections among the transistor 111~114 and signal pins 161~164 of FIG. 1 and related operations are also applicable to the embodiment of FIG. 4. For simplicity, the descriptions will not be repeated here. A difference between the Ethernet communication circuit 400 and the aforementioned embodiments is that the coupling between the transconductance circuit 140 and each of the transistors 111~114 of the embodiment of FIG. 4 is different from that in the aforementioned embodiments. In the Ethernet communication circuit 400, the transistor 111 is coupled between the node 101 and a node 403, the transistor 112 is coupled between the node 101 and a node 404, the transistor 113 is coupled between the node 102 and the node 404, and the transistor 114 is coupled between the node 102 and the node 403.

Another difference between the embodiment of FIG. 4 and the aforementioned embodiments is that the Ethernet communication circuit 400 only requires two switches 431 and 432, and thus the circuit area and hardware cost can be further reduced. The switch 431 is coupled between the node 403 and the current source 120, and the switch 432 is coupled between the node 404 and the current source 120.

The descriptions regarding the operations and the implementations of the transconductance circuit 140 of FIG. 1 are also applicable to the transconductance circuit 140 of FIG. 4. For simplicity, the descriptions will not be repeated here.

When detecting the type of the network cable, the control device 150 of the Ethernet communication circuit 400 selectively turns on one of the switches 431 and 432 to change the signal meaning represented by the current flowing through the node 101 and the current flowing through the node 102. When the control device 150 turns on the switch 431, the control device 150 turns off the switch 432, so that the current flowing through the node 101 and the current flowing through the node 102 are related to the signals received by the signal pins 161 and 164. In this situation, the output voltage Vout of the transconductance circuit 140 is also related to the signals received by the signal pins 161 and 164, so that the control device 150 may determine whether MDI signals appear on the signal pins 161 and 164 according to the output voltage Vout of the transconductance circuit 140.

When the control device 150 turns on the switch 432, the control device 150 turns off the switch 431, so that the current flowing through the node 101 and the current flowing through the node 102 are related to the signals received by the signal pins 162 and 163. In this situation, the output voltage Vout of the transconductance circuit 140 is also related to the signals received by the signal pins 162 and 163, so that the control device 150 may determine whether MDIX signals appear on the signal pins 162 and 163 according to the output voltage Vout of the transconductance circuit 140.

As a result, the control device 150 is able to determine the type of signal transmitted and received on the transmission port according to the output voltage Vout of the transconductance circuit 140, so that the subsequent stage circuit of the Ethernet communication circuit 400 is allowed to perform a corresponding configuration setting, thereby achieving the auto MDI/MDIX function.

The aforementioned transistors of each of the embodiments may be realized with a FET, a BJT, or other transistor structures. When a transistor is realized with a FET, the control terminal of the transistor is a gate of the FET. When the transistor is realized with a BJT, the control terminal of the transistor is a base of the BJT.

In implementation, different functional blocks of each of previous embodiments may be integrated into a single chip, or may be arranged in different circuit chips. For example, the transistors 111, 120, 130, and 140, the current source 120, the switches 431 and 432, and the transconductance circuit 140 of the Ethernet communication circuit 400 may be integrated into the same chip, and the control device 150 and the subsequent stage circuit of the Ethernet communication circuit 400 may be arranged in another chip.

As can be appreciated from the foregoing descriptions, each of the aforementioned Ethernet communication circuits is capable of supporting the auto MDI/MDIX function by utilizing only a single set of transconductance circuit 140, so the required circuit area can be reduced.

In each of the aforementioned embodiments, the control terminals of the transistor 111, 112, 113, and 114 are fixedly coupled with the signal pins 161, 162, 163, and 164, respectively, and no switch component is utilized as an intermedium on each signal path between each of the signal pins 161, 162, 163, and 164 and each of the transistors 111, 112, 113, and 114. With an appropriate design, the control terminals of the transistor 111, 112, 113, and 114 is able to sustain a greater voltage and would not be easily damaged due to ESD. Accordingly, the disclosed structure can effectively prevent the signal path between the aforementioned Ethernet communication circuit and each of the signal pins 161~164 from damage due to ESD.

In addition, since the signals received by the signal pins 161, 162, 163, and 164 are not directly transmitted to the aforementioned switches 131, 132, 133, 134, 431, and 43, these switch elements may be realized with an element having a lower ESD protection level, thereby further reducing the circuitry cost or increasing the flexibility for choosing elements.

Other embodiments of the invention will be apparent to those skilled in the art from consideration of the specification and practice of the invention disclosed herein. It is intended that the specification and examples be considered as exemplary only, with a true scope and spirit of the invention indicated by the following claims.

What is claimed is:

1. An Ethernet communication circuit for processing signals received from a first signal pin, a second signal pin, a third signal pin, and a fourth signal pin, wherein the first signal pin and the fourth signal pin are utilized for receiving a pair of differential medium dependent interface (MDI) signals, and the second signal pin and the third signal pin are utilized for receiving a pair of differential crossover medium dependent interface (MDIX) signals, comprising:
   a current source;
   a first transistor, coupled between a first node and the current source, wherein a control terminal of the first transistor is coupled with the first signal pin;
   a second transistor, coupled between the first node and the current source, wherein a control terminal of the second transistor is coupled with the second signal pin;
   a third transistor, coupled between a second node and the current source, wherein a control terminal of the third transistor is coupled with the third signal pin;
   a fourth transistor, coupled between the second node and the current source, wherein a control terminal of the fourth transistor is coupled with the fourth signal pin;

a first switch, coupled between the current source and the first transistor or coupled between the first node and the first transistor;

a second switch, coupled between the current source and the second transistor or coupled between the first node and the second transistor;

a third switch, coupled between the current source and the third transistor or coupled between the second node and the third transistor;

a fourth switch, coupled between the current source and the fourth transistor or coupled between the second node and the fourth transistor; and a transconductance circuit, coupled with the first node and the second node, and configured to operably generate an output voltage according to a current passing through the first node and a current passing through the second node;

wherein when the first switch turns on, the fourth switch turns on and the second switch and the third switch turn off, and when the second switch turns on, the third switch turns on and the first switch and the fourth switch turn off.

2. The Ethernet communication circuit of claim 1, wherein no switch component is utilized as an intermedium between the control terminal of the first transistor and the first signal pin and no switch component is utilized as an intermedium between the control terminal of the third transistor and the third signal pin.

3. The Ethernet communication circuit of claim 2, wherein the transconductance circuit comprises:
an output terminal;
a fifth transistor, coupled with the first node;
a sixth transistor, coupled with the second node;
a seventh transistor, coupled with the sixth transistor, wherein a control terminal of the seventh transistor is coupled with a control terminal of the fifth transistor;
an eighth transistor, coupled with the fifth transistor and the output terminal, wherein a control terminal of the eighth transistor is coupled with a control terminal of the sixth transistor;
a ninth transistor, coupled with the seventh transistor; and
a tenth transistor, coupled with the output terminal, wherein a control terminal of the tenth transistor is coupled with a control terminal of the ninth transistor.

4. The Ethernet communication circuit of claim 3, wherein the first switch and the second switch are two transistors turned on by opposite control logic levels, and the third switch and the fourth switch are two transistors turned on by opposite control logic levels.

5. The Ethernet communication circuit of claim 3, wherein the first switch and the second switch are two transistors turned on by opposite control logic levels, and the third switch and the fourth switch are two transistors turned on by the same control logic level.

6. The Ethernet communication circuit of claim 3, wherein the first switch and the second switch are two transistors turned on by the same control logic level, and the third switch and the fourth switch are two transistors turned on by opposite control logic levels.

7. The Ethernet communication circuit of claim 3, wherein the first switch and the second switch are two transistors turned on by the same control logic level, and the third switch and the fourth switch are two transistors turned on by the same control logic level.

8. An Ethernet communication circuit for processing signals received from a first signal pin, a second signal pin, a third signal pin, and a fourth signal pin, wherein the first signal pin and the fourth signal pin are utilized for receiving a pair of differential medium dependent interface (MDI) signals, and the second signal pin and the third signal pin are utilized for receiving a pair of differential crossover medium dependent interface (MDIX) signals, comprising:
a current source;
a first transistor, coupled between a first node and a third node, wherein a control terminal of the first transistor is coupled with the first signal pin;
a second transistor, coupled between the first node and a fourth node, wherein a control terminal of the second transistor is coupled with the second signal pin;
a third transistor, coupled between a second node and the fourth node, wherein a control terminal of the third transistor is coupled with the third signal pin;
a fourth transistor, coupled between the second node and the third node, wherein a control terminal of the fourth transistor is coupled with the fourth signal pin;
a first switch, coupled between the third node and the current source;
a second switch, coupled between the fourth node and the current source; and
a transconductance circuit, coupled with the first node and the second node and configured to operably generate an output voltage according to a current passing through the first node and a current passing through the second node;

wherein when the first switch turns on, the second switch turns off, and when the second switch turns on, the first switch turns off.

9. The Ethernet communication circuit of claim 8, wherein no switch component is utilized as an intermedium between the control terminal of the first transistor and the first signal pin and no switch component is utilized as an intermedium between the control terminal of the third transistor and the third signal pin.

10. The Ethernet communication circuit of claim 9, wherein the transconductance circuit comprises:
an output terminal;
a fifth transistor, coupled with the first node;
a sixth transistor, coupled with the second node;
a seventh transistor, coupled with the sixth transistor, wherein a control terminal of the seventh transistor is coupled with a control terminal of the fifth transistor;
an eighth transistor, coupled with the fifth transistor and the output terminal, wherein a control terminal of the eighth transistor is coupled with a control terminal of the sixth transistor;
a ninth transistor, coupled with the seventh transistor; and
a tenth transistor, coupled with the output terminal, wherein a control terminal of the tenth transistor is coupled with a control terminal of the ninth transistor.

11. The Ethernet communication circuit of claim 10, wherein the first switch and the second switch are two transistors turned on by opposite control logic levels.

12. The Ethernet communication circuit of claim 10, wherein the first switch and the second switch are two transistors turned on by the same control logic level.

* * * * *